United States Patent [19]

Martinez-Mugica

[11] Patent Number: 5,013,432
[45] Date of Patent: May 7, 1991

[54] FILTER SYSTEM FOR LIQUIDS WITH PARTICLES IN SUSPENSION

[76] Inventor: Fernando Martinez-Mugica, Larrasoloeta, 5, 48200 Durango, Spain

[21] Appl. No.: 345,104

[22] Filed: Apr. 28, 1989

[51] Int. Cl.$^5$ .......................................... B01D 35/157
[52] U.S. Cl. ................................ 210/195.1; 210/248; 210/258; 210/411; 210/425; 219/69.14; 219/69.15
[58] Field of Search ............... 210/108, 111, 117, 136, 210/137, 195.1, 195.2, 196, 197, 321.69, 411, 420, 424, 532.1, 533, 534, 425, 248, 258, 798; 219/69.14, 69.15

[56] References Cited

U.S. PATENT DOCUMENTS

| 890,989 | 6/1908 | Knight | 210/424 |
|---|---|---|---|
| 2,487,769 | 11/1949 | Ebert et al. | 210/411 |
| 3,678,240 | 7/1972 | Dietrick | 219/69.14 |
| 3,979,290 | 9/1976 | Loffler | 210/534 |
| 4,174,281 | 11/1979 | Dell | 210/534 |
| 4,176,057 | 11/1979 | Wheatley et al. | 210/137 |
| 4,333,839 | 6/1982 | Cardoza et al. | 210/798 |
| 4,473,733 | 9/1984 | Inoue | 219/69.14 |
| 4,571,301 | 2/1986 | Inskeep, Jr. | 210/798 |
| 4,626,332 | 12/1986 | Inoue | 219/69.14 |
| 4,784,169 | 11/1988 | Striedeck | 210/108 |
| 4,804,464 | 2/1989 | Schevey | 210/196 |
| 4,859,324 | 8/1989 | Levy et al. | 210/195.2 |
| 4,921,598 | 5/1990 | Desch | 210/425 |

FOREIGN PATENT DOCUMENTS

| 3114745 | 10/1982 | Fed. Rep. of Germany | 210/533 |
|---|---|---|---|
| 3423424 | 1/1986 | Fed. Rep. of Germany | 210/411 |
| 2494127 | 5/1982 | France | 210/532.1 |
| 0141433 | 7/1985 | Japan | 219/69.14 |
| 3126368 | 5/1988 | Japan | 210/108 |

OTHER PUBLICATIONS

Publication by University of Technology, Eindhoven Netherlands, C. J. Heuvelman et al., "Micro Computer Controlled Spark-Erosion", EDM Digest, pp. 24-28, 9-1980.

Primary Examiner—Robert A. Dawson
Assistant Examiner—Joseph Drodge
Attorney, Agent, or Firm—Lucas & Just

[57] ABSTRACT

A filtering system for liquids with suspended particles is disclosed. The system consists of a receptacle for the liquid with suspended particles, a receptacle for the filtered liquid, a decanting receptacle for residual liquid, a filter, and a valve unit. The valve unit interconnects the receptacles through the filter in order for the filter to perform a filtering phase of filtering the liquid with suspended particles from the receptacle for liquid with suspended particles to the receptacle for filtered liquid; a filter-washing phase against the filter-flow from the receptacle for liquid with suspended particles to the decanting receptacle; and a rinsing phase from the receptacle for liquid with suspended particles to the decanting receptacle.

10 Claims, 2 Drawing Sheets

FILTER SYSTEM FOR LIQUIDS WITH PARTICLES IN SUSPENSION

As is well known, in many fields of industry or agriculture sometimes there is a liquid having suspended particles which cannot be used without filtering out of the suspended particles. Liquids having suspended particles which need filtering include the insulating liquid of an electroerosion machine, machine tool cooling liquid, fermented wine, etc.

A problem arises when the filter of a filtering machine becomes clogged with use by accumulated particles removed during the filtering operation from the liquid having suspended particles.

The filter system of the present invention has a series of receptacles, a filter, and a valve unit. The filter system of the present invention filters the liquid, and washes and rinses the filter without any need to dismantle the components of the system.

The present invention is a filter system for filtering liquids having particles in suspension which comprises:
  (a) a receptacle for liquid with particles suspended therein, which liquid is to be filtered;
  (b) a receptacle for liquid which has been filtered free of particles;
  (c) a decanting receptacle used when washing and rinsing the filter;
  (d) a filter unit; and
  (e) a valve unit which interconnects the receptacles with the filter and which is capable of performing the following different phases:
    (i) a filtering phase which operates between the receptacle for liquid to be filtered and the receptacle having filtered liquid;
    (ii) a filter-washing phase which operates between the receptacle for liquid to be filtered and the decanting receptacle, the flow of the liquid being in the reverse direction than in the filtering phase; and
    (iii) a rinsing phase which operates between the receptacle for liquid to be filtered and the decanting receptacle.

The present invention may be more fully understood with reference to the following figures.

Figure 1:
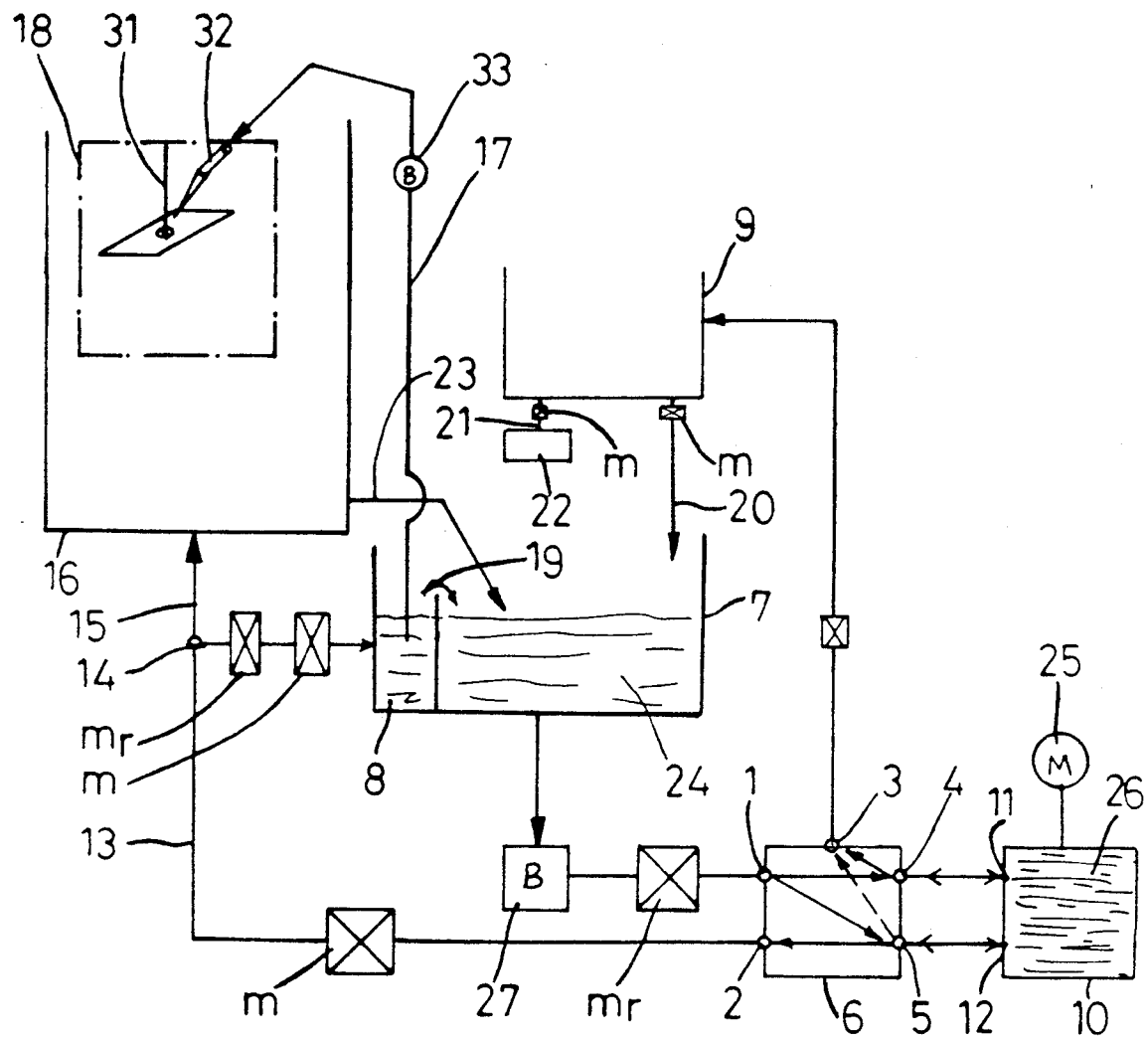
FIG. 1 shows the filter system of the present invention in diagram form.

Referring to FIG. 1, there is liquid with particles in suspension 24 (soiled liquid) which has to be filtered free of the suspended particles in soiled liquid receptacle 7.

In this embodiment the soiled liquid 24 is used insulation liquid from an operating tank 16 of an electroerosion machine 18 via a duct 23.

The soiled liquid 24 is pumped by pump 27 through valve unit 6 and into filter 10. According to the present invention, valve unit 6 has five ducts 1, 2, 3, 4 and 5.

Filter 10 has a conventional filtering element 26, such as that of silica or porcelain, and also has two passages 11 and 12 which can communicate with the ducts of the valve unit 6. During the filtering phase, for example, upper passage 11 communicates with duct 4 of the valve unit 6, i.e. in counterflow, and lower passage 12 communicates with duct 5 of valve unit 6, i.e. flowing downwards.

There is a manometer 25 to ascertain the functioning and degree of obstruction of filter 10.

To recover the liquid which is generally discarded in other systems, there is a decanting receptacle 9 which communicates with filter 10 through duct 3 of valve unit 6. Decanting receptacle 9 also communicates with soiled water receptacle 7.

A filtered liquid receptacle 8 is connected to duct 2 of valve unit 6 by channel 13.

Channel 13 has a fork 14 in order to feed the filtered liquid receptacle 8 and, in this embodiment, a recycling or operating receptacle 16.

The filtering system of the present invention operates in the following way:

For the filtering phase, the soiled liquid 24, pumped by pump 27, travels through valve unit 6 from duct 1 to duct 4 through upper filter passage 11, through lower filter passage 12, to duct 5, and through channel 13.

The system of the present invention also has devices m and $m_r$, such as one-way and regulating valves, pumps, etc., in order to control the flow of filtered liquid through channel 13 to filtered liquid receptacle 8, or to recycling receptacle 16, or to both receptacles simultaneously. Ideally the regulating devices mr are situated between fork 14 and filtered liquid receptacle 8.

With use filter 10 operates less well and it is necessary to regenerate it. In order to regenerate filter 10, valve unit 6 is arranged in such a way so that circulation of liquid moved by pump 27 is from duct 1 to duct 5 through lower passage 12 of filter 10, through upper passage 11 of filter 10, to duct 4, to duct 3, and into the decanting receptacle 9.

Figure 2:
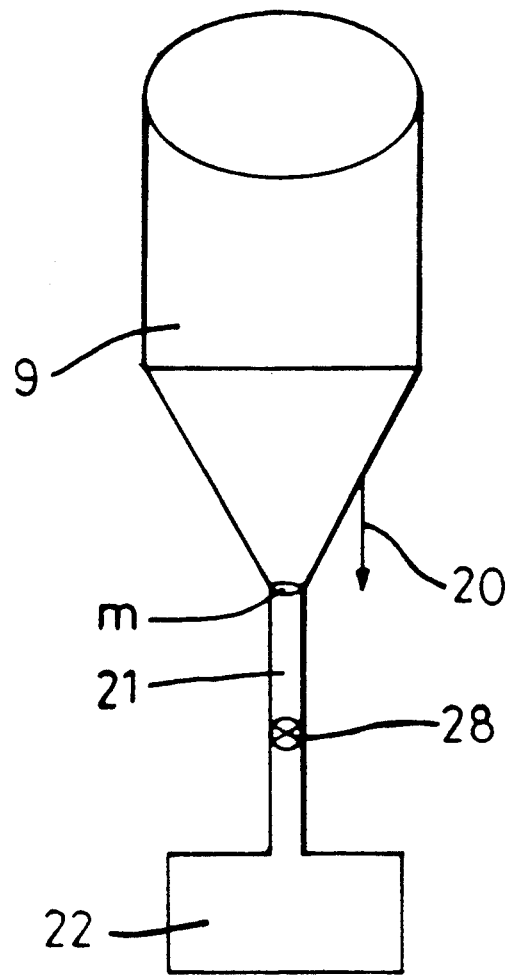
FIG. 2 shows an embodiment of the decanting receptacle.

Liquid reaching decanting receptacle 9 in any phase is soiled. In order to clean this soiled liquid. FIG. 2 illustrates an embodiment wherein decanting receptacle 9 has a sludge dump 22 attached to the bottom thereof. The soiled liquid is left to stand in the decanting receptacle 9 and the particles suspended in the soiled liquid pass from decanting receptacle 9 through decanting duct 21 and are deposited in sludge dump 22. The cleaned liquid remaining in decanting receptacle 9 is displaced upwards towards the top of decanting receptacle 9 through the downward motion of the particles. Sludge dump 22 can be removed when full and another one put in place by means of attachment devices 28.

Figure 3:
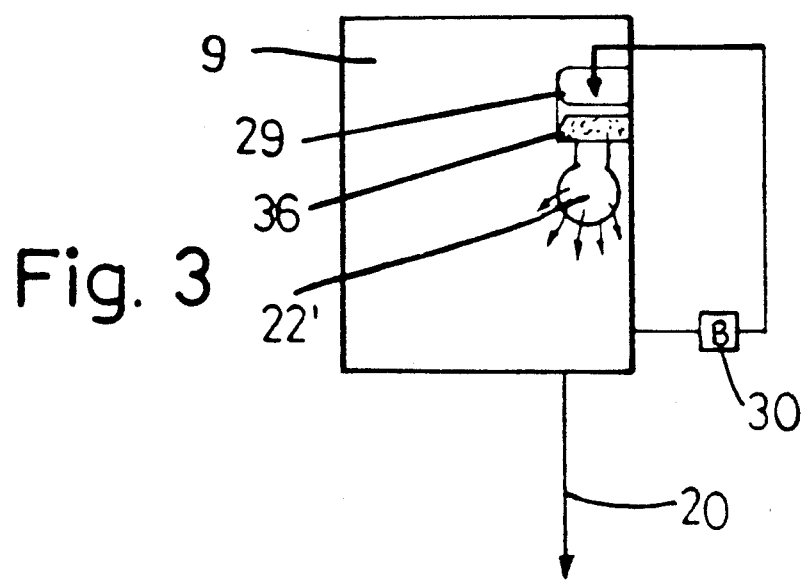
FIG. 3 shows another embodiment of the decanting receptacle.

FIG. 3 illustrates another embodiment of cleaning the liquid reaching decanting receptacle 9. The soiled liquid is pumped by pump 30 into a small depository 29 inside decanting receptacle 9. The bottom 36 of depository 29 is capable of allowing the soiled liquid to pass into a sludge bag 22' which retains the suspended particles and forms a sludge therein.

In both embodiments, the cleaned liquid which remains goes, by force of gravity, through second channel 20 into soiled liquid receptacle 7.

After the filtering phase the filtering component 26 is not in the correct position inside filter 10. Additionally, filtering component 26 is not in the correct state and it still has particles which have resisted being washed away. Therefore, a filter-rinsing phase is performed in order to enable a new filtering phase to begin. Filter 10 is rinsed by liquid circulating from duct 1 to duct 4 through upper passage 11 of filter 10, through lower passage 12 of filter 10, to duct 5, to duct 3 and into decanting receptacle 9.

Filtered liquid may be supplied from filtered liquid receptacle 8 directly to its desired end use. For example, in order to lubricate the thread or electrode 31 in an electroerosion machine 18, filtered liquid 32 is supplied directly to electrode 31 by means of channel 17 and pump 33.

There may be an overflow 19 of filtered liquid from filtered liquid receptacle 8 into soiled liquid receptacle 7.

Decanting receptacle 9 and filtered liquid receptacle 8 are positioned higher than soiled liquid receptacle 7.

The filtering system of the present invention may be controlled, operated and regulated by means of a computer program.

I claim:

1. A filtering system for filtering liquids having particles in suspension comprising:
   (a) a first receptacle for liquid to be filtered free of particles;
   (b) a second receptacle for filtered liquid which is free of particles;
   (c) a decanting receptacle;
   (d) a filter; and
   (e) a valve unit constructed and arranged to fluidly connect the first receptacle, the second receptacle, and the decanting receptacle with each other and with the filter, the valve unit the filtering system having a filtering phase, a filter-washing phase and a rinsing phase, having means to differently connect the receptacles in the respective phases:
   (f) the valve unit comprising means to:
      (i) cause the liquid to flow from the first receptacle through the filter in a filtering direction to the second receptacle during the filtering phase;
      (ii) cause the liquid to flow from the decanting receptacle through the filter in a direction counter to the filtering direction to the first receptacle during the filter-washing phase; and
      (iii) cause the liquid to flow from the first receptacle through the filter in a filtering direction to the decanting receptacle during the rinsing phase.

2. The filtering system of claim 1 wherein the connection between the valve unit and the second receptacle is a first channel which has a fork means which allows the filtered liquid to be deposited in a recycling container of an operating station.

3. The filtering system of claim 2 further comprising a duct between the recycling container and the first receptacle.

4. The filtering system of claim 2 wherein both the decanting receptacle and the recycling container are situated higher than both the first and second receptacles.

5. The filtering system of claim 1 wherein the second receptacle ha a second channel means which allows for supply of filtered liquid to an operating station.

6. The filtering system of claim 5 wherein the operating station is an electroerosion machine and the filtered liquid is to be supplied to an electroerosion electrode within the machine.

7. The filtering system of claim 1 wherein further comprising means to allow excess filtered liquid to overflow from the second receptacle to the first receptacle.

8. The filtering system of claim 1 wherein the decanting receptacle is directly connected to the first receptacle and wherein the decanting receptacle also has a waste sludge dump.

9. The filtering system of claim 1 further comprising at least one pump in order to control and regulate the flow of liquid in the system.

10. The filtering system of claim 1 wherein the decanting receptacle is situated higher than both the first and second receptacles.

* * * * *

UNITED STATES PATENT AND TRADEMARK OFFICE
CERTIFICATE OF CORRECTION

PATENT NO. : 5,013,432
DATED : May 7, 1991
INVENTOR(S) : Fernando Martinez-Mugica It is certified that error appears in the above-identified patent and that said Letters Patent is hereby corrected as shown below:

Column 2, line 26, change "mr" to --$m_r$--;

Column 3, line 27, delete "the valve unit".

Column 3, line 29, after "phase," insert --the valve unit--.

Column 4, line 18, change "ha" to --has--.

Signed and Sealed this

Tenth Day of November, 1992

Attest:

DOUGLAS B. COMER

*Attesting Officer*     Acting Commissioner of Patents and Trademarks

UNITED STATES PATENT AND TRADEMARK OFFICE
CERTIFICATE OF CORRECTION

PATENT NO. : 5,013,432
DATED : May 7, 1991
INVENTOR(S) : Fernando Martinez-Mugica It is certified that error appears in the above-identified patent and that said Letters Patent is hereby corrected as shown below:

Column 3, line 35 (claim 1), change "decanting" to --first--.

Column 3, line 37 (claim 1), change "first" to --decanting--.

Signed and Sealed this

Twenty-fifth Day of May, 1993

Attest:

MICHAEL K. KIRK

Attesting Officer     Acting Commissioner of Patents and Trademarks